United States Patent [19]

Dunn et al.

[11] 4,156,339

[45] May 29, 1979

[54] LAWN MOWER BAG

[75] Inventors: Ronald K. Dunn, Evansville; Donald L. Menchoffer, Indianapolis; Charles E. Sorenson, Mount Vernon, all of Ind.

[73] Assignee: Clarke-Gravely Corporation, Muskegon, Mich.

[21] Appl. No.: 864,506

[22] Filed: Dec. 27, 1977

[51] Int. Cl.$^2$ ............... A01D 35/22; A01D 53/06
[52] U.S. Cl. ............................ 56/202; 55/380; 150/7
[58] Field of Search ............... 56/202; 150/7; 55/DIG. 2, DIG. 26, 380

[56] References Cited

U.S. PATENT DOCUMENTS

| | | | |
|---|---|---|---|
| 2,528,192 | 10/1950 | Urban | 150/7 |
| 2,620,004 | 12/1952 | Heitmeyer | 150/7 |
| 3,047,998 | 8/1962 | Leader et al. | 56/202 |
| 3,928,956 | 12/1975 | Boyer | 56/202 |
| 3,943,988 | 3/1976 | Consorti | 150/7 |
| 3,962,852 | 6/1976 | Boyer | 56/202 |
| 4,028,074 | 6/1977 | Schaaf | 55/DIG. 2 |
| 4,102,487 | 7/1978 | Soto | 150/7 |
| 4,119,414 | 10/1978 | Smaling | 55/DIG. 2 |

FOREIGN PATENT DOCUMENTS 716774  8/1965  Canada .................... 56/202

Primary Examiner—Louis G. Mancene
Assistant Examiner—Paul J. Hirsch
Attorney, Agent, or Firm—Jenkins, Coffey & Hyland

[57] ABSTRACT

A lawn mower bag captures clippings and debris from the output of a lawn mower and may be carried at its rear. The bag includes an inlet adapted to be connected to the output of a rotary lawn mower and a large outlet opening for emptying of its contents. The portion of the bag forming the outlet opening is closed by and carried on the lawn mower through a plurality of hook-like fasteners arranged about the periphery of the outlet opening. The bag is easily fastened to and unfastened from the lawn mower and its contents can be emptied easily and controllably.

17 Claims, 10 Drawing Figures

LAWN MOWER BAG

This invention relates to a bag to be used to capture the clippings and debris blown from the exhaust of a rotary lawn mower, and more particularly, to a bag to be carried at the rear of a rotary lawn mower and easily fastened and unfastened from such a lawn mower.

Existing lawn mower bags most commonly include zippers as the preferred closure for the opening of the bag from which its contents are emptied. Zippers are relatively expensive fasteners and their operation has a tendency to become unreliable through interference by small particles, small clippings, and their residue. Furthermore, such zipper fasteners are not used to engage the lawn mower structure or carry the weight of the bag and its contents.

In this invention, a lawn mower bag is formed, at least in part, from an air permeable material to capture the clippings and debris thrown from the outlet of a rotary lawn mower without unduly impeding the flow of its exhaust air. The bag includes an inlet opening adapted to fit the outlet duct of a lawn mower and a large outlet opening from which the contents of the bag can be emptied. The portion of the bag forming the outlet opening includes a plurality of hook-like fasteners arranged about its periphery. At least one of the fasteners carries a portion of the periphery of the outlet of the bag and is adapted to engage and support the bag from the lawn mower. The remaining fasteners are located about the periphery of the outlet opening in such a manner to permit this portion of the bag to be folded and carried by the lawn mower so that the outlet opening is closed.

The portion of the bag forming the outlet opening can include a flap, and the fasteners at the outlet opening can be adapted to be retained, when the bag is supported on the lawn mower, with the flap crossed over the outlet opening and held in place. The portion of the bag forming the outlet opening may include two flaps and, with the fasteners, be adapted to hold the opening in a shape to permit convenient pouring of the contents of the bag as it is being emptied. Another portion of the periphery of the bag forming the outlet opening can include a second supporting bar including a fastener to engage the lawn mower, close the outlet opening, and support the weight of the bag from the lawn mower.

The hook-like fasteners used in the invention permit the weight of the bag and its contents to be carried by the structure of the lawn mower, and provide fastening means that can be easily and quickly engaged and disengaged. Thus, this invention provides a bag that may be quickly and conveniently fastened to and unfastened from a lawn mower and permits the contents of the bag to be poured in a controlled and directed manner by the user.

The lawn mower bag of this invention is intended to capture grass clippings and debris that will be blown from the outlet duct or exhaust of a rotary lawn mower while it is in use. Such lawn mowers use a blade which is rotated rapidly, generally by an electric motor or gasoline engine. The rotating blade provides a fan-like action to carry the clippings and debris from under the lawn mower in a flow of air. The bag is intended to intercept and remove from this flow of air the clippings and debris without unduly impeding the air flow. The bag must therefore include at least a portion of air permeable material that includes a sufficient number of small openings to not unduly inhibit the flow of air from the lawn mower but to intercept and capture clippings and debris from the flowing air. A substantial portion of the bag, however, may be constructed of material which does not provide an escape path for the flowing air. Materials which may be conveniently used to form such air permeable portions of the bag may be a loosely woven fabric or a flexible mesh formed with plastic fibers or other such air permeable materials which provide a series of small openings through which flowing air can pass.

Figure 1:
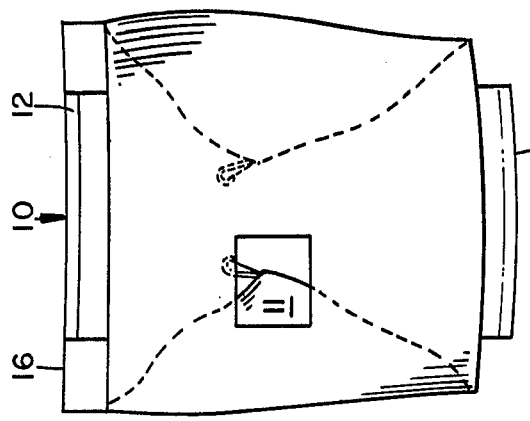
FIG. 1 is a front view of such a bag.
Figure 2:
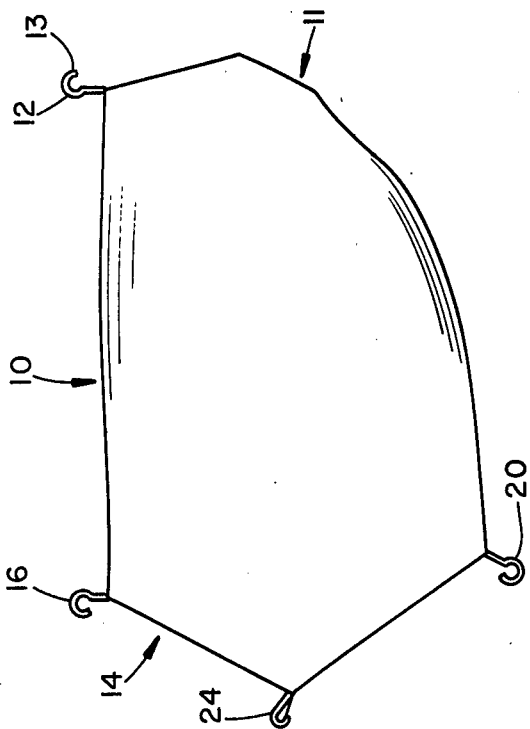
FIG. 2 is a side view of the bag.
Figure 10:
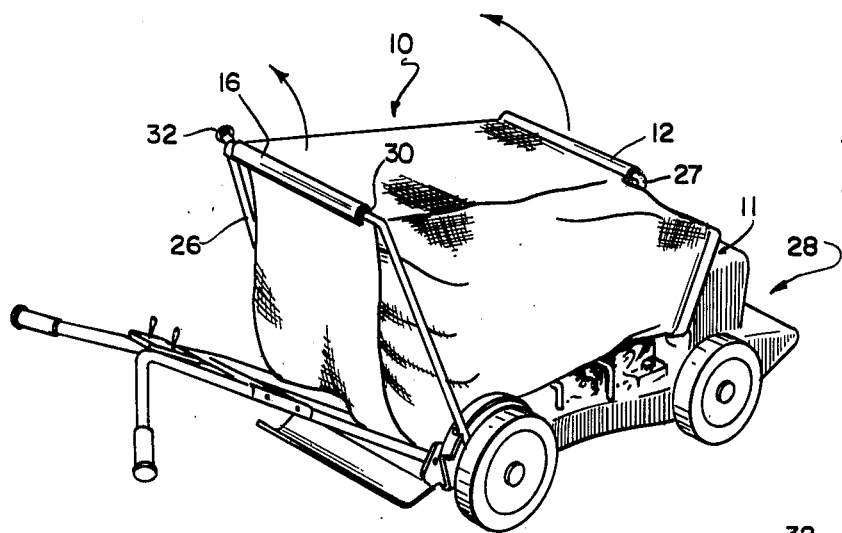
FIG. 10 is a perspective view of a lawn mower carrying such a bag.
Figure 7:
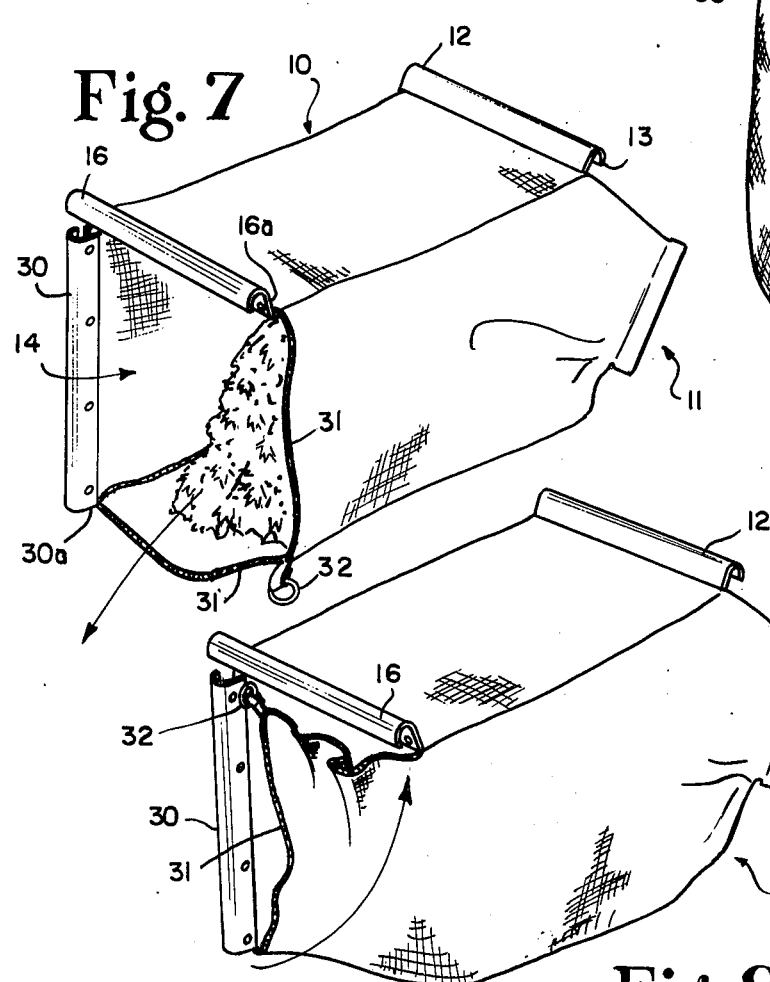
FIG. 7 is a perspective view of another embodiment of such a bag.

The bag 10 is stitched in a long container-like shape, as shown in FIG. 2 and FIG. 7. An inlet opening 11 is formed at the forward portion of the bag 10, as shown in FIG. 1 and FIG. 7. Above the inlet opening 11, there is a supporting bar 12 fastened to the bag and including a hook portion 13 adapted to engage a supporting structure on the lawn mower (as shown in FIG. 4 and FIG. 10).

Figure 3:
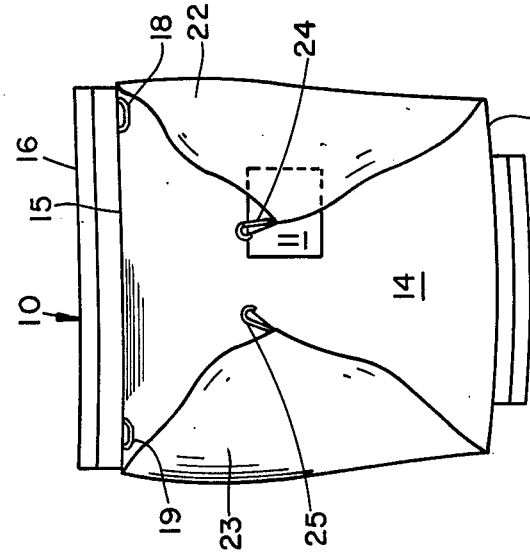
FIG. 3 is a rear view of the bag showing the outlet opening.

Referring now to FIGS. 2, 3 and 7, a large outlet opening 14 is formed at the rear of the bag 10. As best seen in FIG. 3 and FIG. 7, a plurality of fasteners is provided around the periphery of the portion of the bag forming the outlet opening.

The bag shown in FIGS. 1 through 6 includes, along the top portion of the periphery of the outlet opening 14, a hook-like fastener 16 and a supporting bar 15 to carry the bag. The supporting bar 15 can provide portions 18 and 19 adapted to be engaged by other fasteners around the periphery of the outlet opening. Such engageable portions of the supporting bar may be rings fastened to the bar as shown, openings formed in the bar itself, or hook-like portions or other fasteners complementary to those on the bag. Another hook-like fastener 20 is attached to the bag at the portion forming the bottom of the periphery of the outlet opening. Fastener 20 may be attached to or form a part of a second bar 21 supporting the portion of the periphery of the outlet opening at its bottom. The bag may include flaps intermediate the top and bottom portions of the outlet opening, such as the flaps shown as 22 and 23 in FIG. 3. Fasteners 24 and 25 are provided at each side of the outlet opening intermediate the fasteners 16 and 20 at the top and the bottom, and are preferably provided at the edges of flaps intermediate the top and bottom as shown in FIG. 3. Fasteners 24 and 25 may be hooks with snap-lock retainers as shown in the FIGS. 1 through 6.

Figure 4:
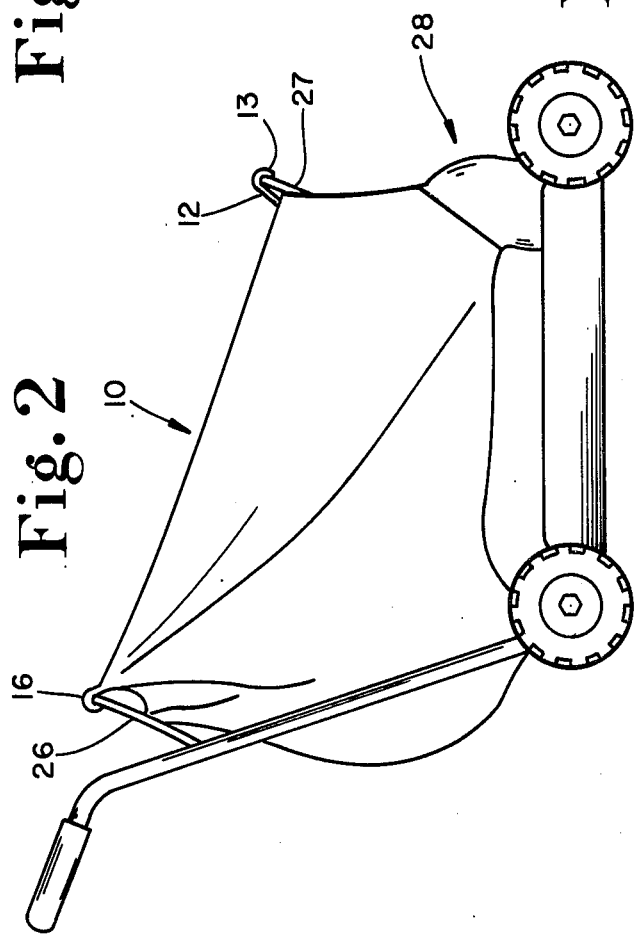
FIG. 4 is a side view of the bag carried by a lawn mower.
Figure 5:
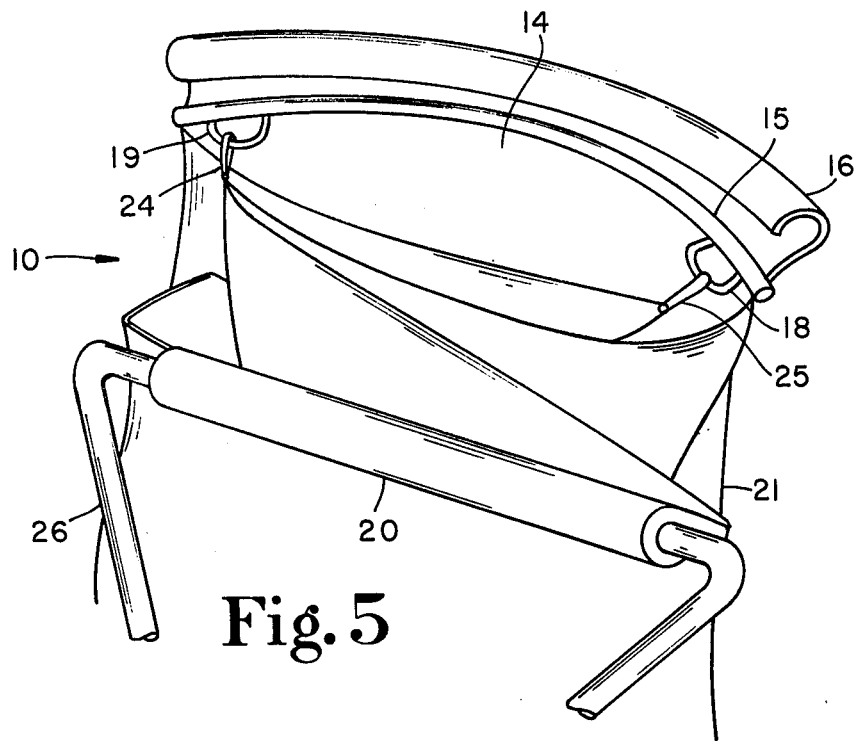
FIG. 5 is a partial perspective view of such a bag showing the manner in which the outlet opening of the bag folds and can be attached to a lawn mower supporting structure.

The bag is easily fastened to and unfastened from the lawn mower by use of the hook-like fasteners 13, 16 and 20 as shown in FIGS. 4 and 5.

Referring now to FIG. 5, in closing the outlet opening by these means, fastener 25 is used to fold the portion of the bag forming one side of the outlet opening across the opening and hold it in this position by engaging portion 18 of the supporting bar 15. In like manner, fastener 24 from the other side of the outlet opening is used to fold that side of the bag across the opening and hold it in that position by fastening to portion 19 of supporting bar 15. With fasteners 24 and 25 so fastened to portions 18 and 19 of supporting bar 15, fastener 20 is hooked to a supporting structure 26 of the lawn mower and fastener 16 of supporting bar 15 is likewise hooked to the supporting structure 26 overlying fastener 20, as shown in FIGS. 4 and 5. Fasteners 16 and 20 may extend along the entire length of the supporting structure 26 or only portions thereof depending upon the strength of the bag material and supporting bars, if any, at its outlet opening.

Thus fastened to the lawn mower, the rear of the bag 10 is closed by a plurality of folds of the material from which it is formed, and the weight of the bag and its contents are carried by the lawn mower through the fasteners about the periphery of the outlet opening. Such a lawn mower bag is easily adapted to be carried at the rear of a lawn mower.

Figure 6:
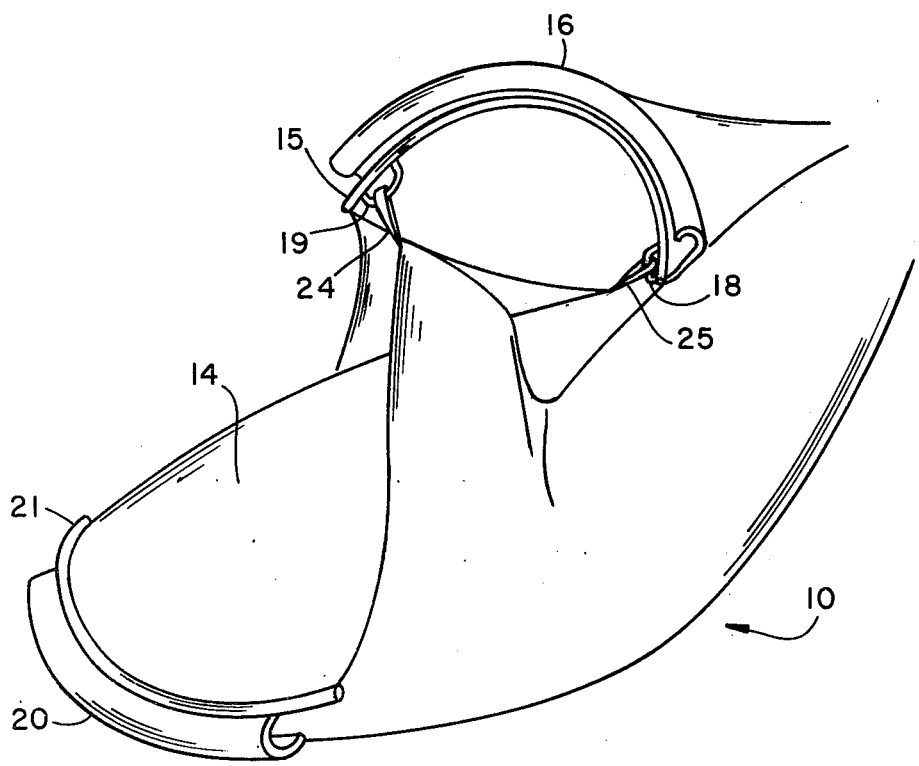
FIG. 6 is a partial perspective view of such a bag showing the manner in which the outlet opening of the bag can be formed for control of emptying of its contents.

As shown in FIG. 6, this arrangement, in addition to its other advantages, can shape the outlet opening so that the contents of the bag may be poured from the opening 14 in a controlled and directed fashion. Fasteners 24 and 25 and supporting bars 15 and 21 may be arranged so that after the bag is unfastened from the lawn mower, the outlet opening 14 forms under the weight of the contents of the bag a trough-like shape from which the contents of the bag may be easily poured. In this regard, supporting bars 15 and 21 may be formed from a flexible and resilient material such as nylon, polypropylene, polyethylene, or spring steel, or the like. Supporting bar 15 makes a convenient handle adjacent the opening 14 from which the contents are poured.

Figure 9:
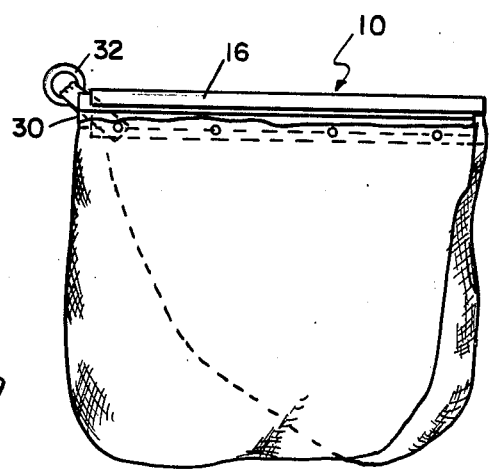
FIG. 9 is a rear view of the bag of FIG. 7 with the outlet opening closed and ready for attachment to a lawn mower.
Figure 8:
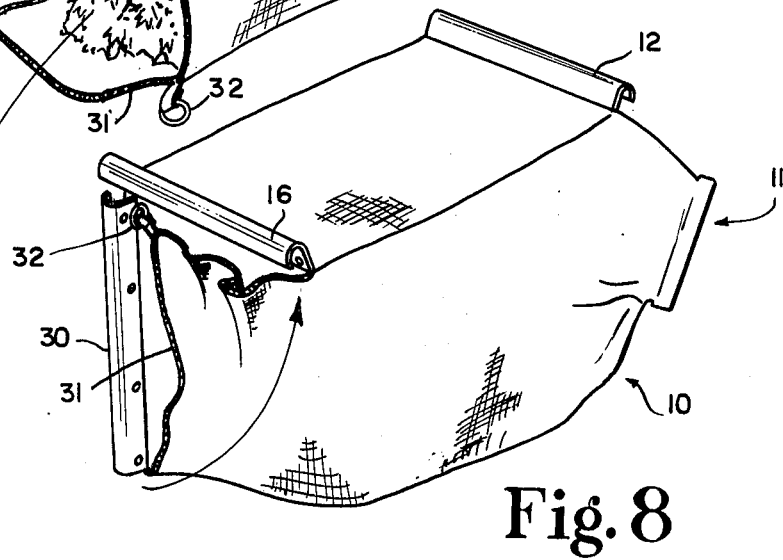
FIG. 8 is a perspective view of the bag of FIG. 7 showing the manner in which the outlet opening of the bag folds closed.

The bag shown in FIGS. 7-10 includes, along the top portion of the periphery of the outlet opening 14, a hook-like fastener 16 and along an adjoining side portion of the periphery of the outlet opening 14, another hook-like fastener 30. The hook-like fasteners 16 and 30 cooperate to close the outlet opening 14 of the bag and carry the bag upon the lawn mower. The hook-like fasteners 16 and 30 are so shaped and dimensioned that fastener 30 is adapted to fit closely within fastener 16. Fasteners 16 and 30 include, respectively, portions 16a and 30a extending below their respective hook portions a distance of approximately one inch. The remainder of the periphery of the outlet opening 31 includes a fastener 32 provided at its edge in an area intermediate the opposite ends of fasteners 16 and 30. The portion 31 of the bag may have a flap-like form, if desired. The bag is easily fastened to and unfastened from the lawn mower by use of the hook-like fasteners 16 and 30 as shown in FIGS. 8-10. In closing the outlet opening by these means, fastener 32 is used to fold the portion of the bag 31 across the outlet opening 14 by moving fastener 32 to a position intermediate the adjoining ends of hook-like fasteners 16 and 30, as shown in FIG. 8. Fastener 32 is held in this position as hook-like fastener 30 is rotated upwardly and fitted within hook-like fastener 16, as indicated in FIG. 8. The portions 16a and 30a of, respectively, hook-like fasteners 16 and 30 because of the closely interfitting nature of fasteners 16 and 30 maintain fastener 32 in this position, as shown in FIG. 9, and maintain the outlet opening 14 closed. With fasteners 16 and 30 so engaged and maintaining fastener 32 and bag portion 31 in a position closing the outlet opening of the bag, the fasteners 16 and 30 are hooked to the supporting structure 26 of the lawn mower, and hook-like fastener 12 at the forward portion of the bag is hooked to supporting structure 27 of the lawn mower.

A lawn mower bag of this invention may be quickly and conveniently fastened to and unfastened from a lawn mower, and its contents may be easily emptied by user. The portion of the bag forming the outlet opening thus includes at its periphery a plurality of hook-like fasteners. The fasteners are adapted to carry a portion of the periphery of the bag at the outlet opening and to engage and support the bag from the lawn mower while holding the portion of the bag forming the outlet opening in such a manner that it is retained closed as it is carried by the lawn mower. In the embodiments illustrated hook-like fasteners form two side portions of the periphery of the outlet opening, and the remaining portion of the periphery is adapted with additional fastening means to be retained across the outlet opening when the bag is supported from the lawn mower. The remaining portion of the periphery of the outlet opening may form one or more flaps to be retained across the outlet opening of the bag. The embodiments of the invention described above may be modified and changed in construction and arrangement without departing from the spirit and scope of the invention as set forth in the claims.

I claim:

1. A lawn mower bag including an inlet opening adapted to fit an outlet duct of a lawn mower and an outlet opening to empty the bag of its contents, said outlet opening being formed with a top and bottom portion having attached supporting rods and with flaps between said top and bottom portions with a fastener on each flap adapted to engage one of the supporting rods, a portion of said bag being formed from an air permeable material and said supporting rods providing hook-like fasteners to support the bag from the lawn mower.

2. A lawn mower bag as set forth in claim 1 wherein the large opening is at the back of the bag and the supporting rod forming the top of the outlet opening has portions to be engaged by the hook-like fasteners on each flap to permit the flaps to be crossed and fastened to provide, at the back of the bag, multiple layers and to form the outlet opening for pouring its contents when emptying.

3. A lawn mower bag as set forth in claim 1 wherein said supporting bars are flexible and resilient.

4. A lawn mower bag having at its forward portion an inlet opening adapted to fit the exhaust duct of a rotary lawn mower and a first supporting rod with a hook-like fastener to support the forward portion of the bag from the lawn mower, and having at its rear portion an outlet opening to permit its contents to be easily emptied and second and third supporting rods forming two opposing sides of the outlet opening and including hook-like fasteners to support the rear portion of the bag from the lawn mower, said bag also including an air permeable portion and means between the second and third supporting rods permitting the bag to be folded closed as the hook-like fasteners of the second and third supporting rods are attached to the lawn mower.

5. A lawn mower bag as set forth in claim 4 wherein said means includes two hooks, said second supporting bar has two portions adapted to be engaged by said two hooks, and the portions of the bag between the second and third supporting bars carries said two hooks in such a manner that each such portion can be folded across the opening.

6. A bag for a rotary lawn mower comprising
a bag having an air permeable portion and including an inlet opening adapted to fit the outlet duct of a rotary lawn mower and an outlet opening to permit the bag contents to be emptied,
the portion of the bag forming the outlet opening including at the periphery of the opening a plurality of hook-like fasteners, at least one of said fasteners being adapted to carry a portion of the periphery of the bag at the outlet opening and to engage and support the bag from the lawn mower, the remaining fasteners being located about the periphery to permit the remaining portion of the bag at the outlet to be folded and carried by the lawn mower so the outlet is closed.

7. A bag as set forth in claim 6 wherein said one fastener includes a first supporting bar and the opening of the bag includes a second bar at the outlet opening opposite the first bar and the bag includes two flaps between the two bars with one of said fasteners being located at each flap, the first bar including portions adapted to be engaged by the fasteners of each flap to form the outlet opening, when so engaged, to permit the contents to be poured in a controlled manner.

8. A bag as set forth in claim 6 wherein said one fastener includes a first supporting bar and the opening of the bag includes a second bar at the outlet opening adjacent the first bar to carry a portion of the periphery of the bag, and the remaining portion of the periphery of the bag at the outlet opening includes a fastener being located intermediate the opposite ends of the first and second bars, the first and second bars being adapted to engage the fastener and retain the remaining portion of the bag across the outlet opening when carried by the lawn mower.

9. A bag as set forth in claim 6 wherein said bar carrying a portion of the periphery of the outlet opening is formed from a flexible and resilient material and provides portions engageable by the remaining fasteners and at least two of the remaining fasteners are located about the periphery of the outlet opening so that they can be engaged with the engageable portions of said bar to form the outlet opening for pouring of the bag's contents.

10. A lawn mower bag adapted to fit a lawn mower outlet and be carried at the rear of a lawn mower and including an inlet opening connectable with the lawn mower outlet and an outlet opening to permit the bag to be emptied, portions of the bag forming the outlet opening including and being supported by bars to form two sides of the opening with the remaining portion of the bag forming the outlet opening being formed to permit folding when the bars are brought together, said bars including means to hook the bag to a supporting structure on the lawn mower and to close the outlet opening.

11. A lawn mower bag as set forth in claim 10 wherein the remaining portion of the bag is between the two bars and forms flaps on each side of the outlet opening, each with a hook-like fastener, and one of said bars provides engageable portions for said hook-like fasteners.

12. A lawn mower bag as set forth in claim 11 wherein the supporting structure of the lawn mower is a bar and the one of said bars is formed from a flexible and resilient material and with a hook-like cross-section to engage said bar and said engageable portions are rings carried by said bar.

13. A lawn mower bag as set forth in claim 10 wherein the bars adjoin and form adjoining sides of the outlet opening and the remaining portion folds like a flap across the outlet opening and includes a fastener retainable adjacent the adjoining ends of the bars.

14. A lawn mower bag as set forth in claim 13 wherein the bars are rigid and hook-like and are adapted to fit closely one within the other and to trap, when so fitted and attached to a lawn mower, the fastener and to retain the remaining portion of the bag folded over the outlet opening.

15. A lawn mower bag including an inlet opening adapted to fit an outlet duct of a lawn mower and an outlet opening to empty the bag of its contents, said outlet opening being formed with a top and a side portion having attached hook-like fasteners and with the remaining portion with a fastener adapted to be engaged when the bag is supported from the lawn mower to retain the remaining portion and close the outlet opening, a portion of said bag being formed from an air permeable material and said hook-like fasteners supporting the bag from the lawn mower.

16. A lawn mower bag having at its forward portion an inlet opening adapted to fit the exhaust duct of a rotary lawn mower and a first supporting rod with a hook-like fastener to support the forward portion of the bag from the lawn mower, and having at its rear portion an outlet opening to permit its contents to be easily emptied and second and third supporting rods forming two sides of the outlet opening and including hook-like fasteners to support the rear portion of the bag from the lawn mower, said bag also including an air permeable portion and means adjacent the second and third supporting rods permitting the bag to be retained closed as the hook-like fasteners of the second and third supporting rods are attached to the lawn mower.

17. A lawn mower bag as set forth in claim 16 wherein said means includes a fastener, said second and third supporting bars have a portion adapted to be engaged by said fastener, and is adapted to be retained between the second and third supporting bars and retain the bag folded across the opening.

* * * * *